Figure 1:
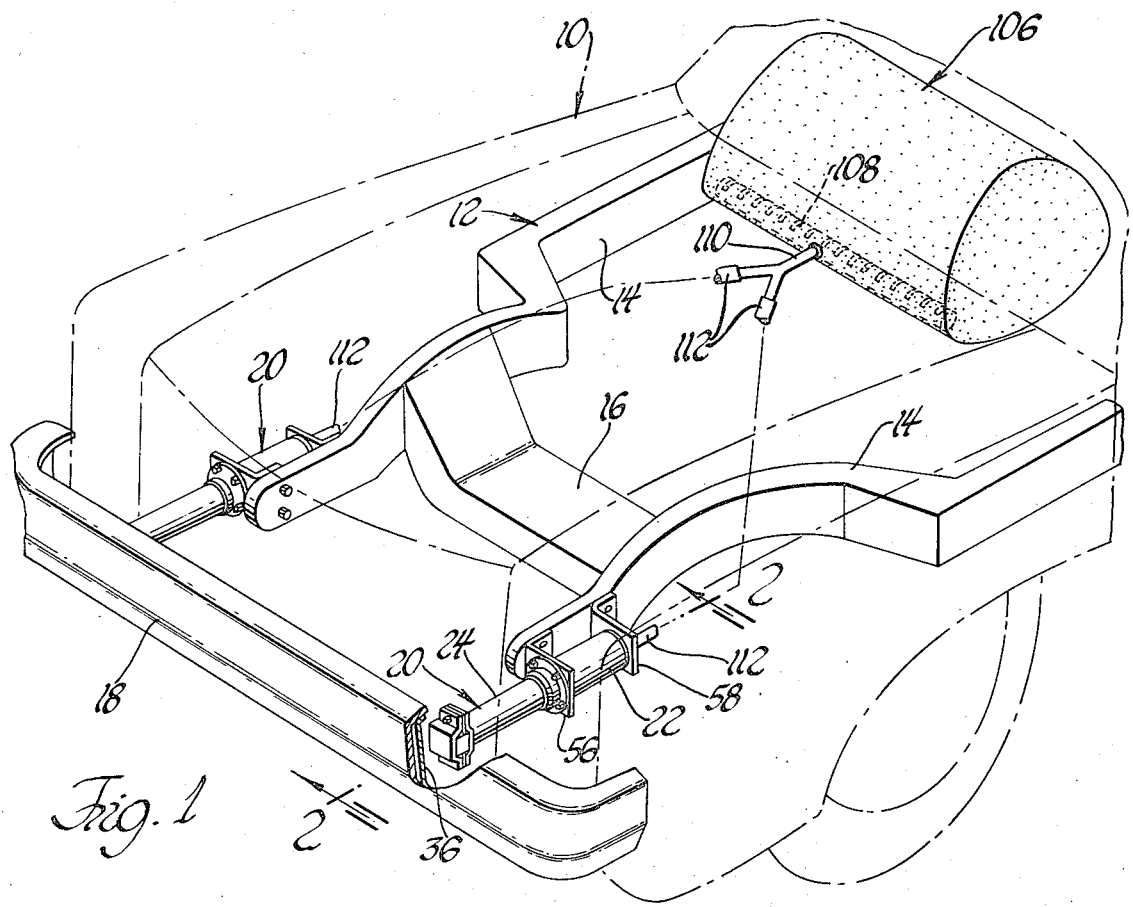

United States Patent [19]

Lindbert et al.

[11] 3,856,326
[45] Dec. 24, 1974

[54] OCCUPANT RESTRAINT SYSTEM

[75] Inventors: Brook A. Lindbert, Utica; Wesley L. McCollum, Brighton; Edward H. Mertz, Birmingham, all of Mich.

[73] Assignee: General Motors Corporation, Detroit, Mich.

[22] Filed: Nov. 24, 1972

[21] Appl. No.: 309,458

[52] U.S. Cl. ................ 280/150 AB, 180/91, 293/2
[51] Int. Cl. ............................................ B60r 21/08
[58] Field of Search ...... 280/150 AB; 180/82 R, 91, 180/94; 293/1, 2, 60, 68, 69, 70, 73, 85, 89; 188/1 C; 267/116, 136, 139

[56] References Cited
UNITED STATES PATENTS

| | | | |
|---|---|---|---|
| 1,784,387 | 12/1930 | Postel................................ | 293/71 R |
| 3,547,467 | 12/1970 | Pociask ........................ | 280/150 AB |
| 3,689,054 | 9/1972 | Gouirand ............................. | 267/68 |
| 3,700,273 | 10/1972 | Jackson et al. ....................... | 293/89 |
| 3,713,665 | 1/1973 | Gouirand ............................. | 293/68 |
| 3,718,332 | 2/1973 | Jones............................ | 280/150 AB |

FOREIGN PATENTS OR APPLICATIONS

| | | | |
|---|---|---|---|
| 953,312 | 3/1964 | Great Britain................ | 280/150 AB |

*Primary Examiner*—David Schonberg
*Assistant Examiner*—John P. Silverstrim
*Attorney, Agent, or Firm*—Herbert Furman

[57] ABSTRACT

A vehicle includes an energy absorbing bumper system having an impact bar supported by like spaced pairs of telescopic energy absorbing struts. Each strut includes an inner member having an outer closed end secured to the impact bar and an outer member secured to the frame of the vehicle. An apertured end cap on the open inner end of the inner member provides a piston slidably received within the outer member and cooperating with the outer closed end of the outer member to provide a variable volume first chamber receiving a displaceable pressurized fluid medium such as Freon or other gas liquefied under pressure at ambient temperatures. A piston slidably received within the inner member divides the interior thereof into a variable volume second chamber receiving pressurized compressed gas to provide a gas spring biasing the inner member and impact bar outwardly of the outer member. A normally closed valve in the outer closed end of the outer member includes a metering pin received within the aperture of the end cap to provide a variable area orifice controlling the rate of flow of the fluid medium between the first and second chambers under impact forces applied to the impact bar to absorb the energy of such forces. An inflatable occupant restraint cushion is mounted within the occupant compartment of the vehicle and communicated with the valves in the outer closed ends of the outer members. When the inner members move within the outer members under impact forces applied to the impact bar, the fluid medium is displaced from the first chambers to the second chambers through the variable area orifices after the pressurized gas in the third chambers is initially compressed. The area of the orifices is gradually decreased by the metering pins as the inner members move within the outer members to pressurize the first chambers and absorb the energy of the impact forces. Should the impact forces exceed a predetermined limit, the inner members will move within the outer members to a position wherein the pistons of the inner members engage their respective metering pins and open the valves to permit the flow of the fluid medium to the inflatable cushion to inflate the cushion. The fluid medium expands to a vapor as it flows to the cushion.

4 Claims, 2 Drawing Figures

PATENTED DEC 24 1974

3,856,326

OCCUPANT RESTRAINT SYSTEM

This invention relates to occupant restraint systems for vehicles and more particularly to such systems which include an inflatable occupant restraint inflated by pressure fluid when impact forces generated by impact of the vehicle with an obstacle exceed a predetermined limit.

Occupant restraint systems which include an inflatable occupant restraint, such as a cushion, are well known. Such systems may include a pressure vessel, a gas generator source or a hybrid type source providing pressure fluid for inflation of the restraint. Inertia type sensors or velocity type sensors actuated by impact of the vehicle with an obstacle, communicate the pressure fluid source with a battery or other source of electrical current. It is also known to actuate the pressure fluid source by deformation of the bumper of the vehicle or controlled movement of the bumper relative to the chassis under impact. Such deformation or movement may mechanically actuate a switch or may actuate a pressure responsive switch through pressure fluid contained within the bumper support system for use as an energy absorber or otherwise.

The system of this invention differs from such known systems in that a displaceable fluid medium employed as an energy absorber within an energy absorbing bumper support is also used as the medium for inflating the cushion. The medium functions as an energy absorber until such time as a particular impact of the vehicle with an obstacle generates impact forces which exceed a predetermined limit. Upon the occurrence of such an impact, the support functions as a sensor and releases the medium for flow to the inflatable cushion to inflate the cushion for use by an occupant of the vehicle. The limit may be the energy absorbing limit of the bumper support or otherwise.

In a specific embodiment of the invention, the energy absorbing bumper support is of the telescopic type and includes a variable volume first chamber in one telescopic member which communicates with a second chamber in the other telescopic member across a variable area orifice provided by a metering pin and an orifice in a piston carried by the other member. The one member is mounted on the vehicle frame and telescopically receives the other member which supports the bumper. The first and second chambers are filled with Freon liquefied under pressure at ambient temperatures. An additional chamber in the other member is separated from the second chamber by a second piston and provides a gas spring biasing the members apart when the impact forces applied to the other member through the bumper cease. The metering pin is formed as part of a valve controlling communication of the first chamber with an inflatable occupant restraint cushion. The metering pin and orifice function to control the flow of the liquefied Freon between the first and second chambers and thereby absorb the energy of the impact forces. When the impact forces exceed a predetermined limit, the second piston engages the metering pin and opens the valve to permit the flow of the Freon to the cushion to inflate the cushion. The Freon expands to a vapor as it flows to the cushion. The Freon thus functions both as an energy absorber and as the inflating medium for the cushion. It will function indefinitely as an energy absorber but is instantaneously available as an inflating fluid medium when necessary.

It is therefore the primary object of this invention to provide an improved occupant restraint system for a vehicle wherein inflation of an inflatable occupant restraint is obtained through the use of the energy absorbing medium of an energy absorbing mounting of the bumper or impact bar of the vehicle.

It is another object of this invention to provide such a system wherein the inflatable occupant restraint is inflated by the energy absorbing medium when impact forces applied to the bumper exceed a predetermined limit.

It is a further object of this invention to provide such a system wherein the energy absorbing mounting functions as the sensor sensing the magnitude of the impact forces.

Figure 2:
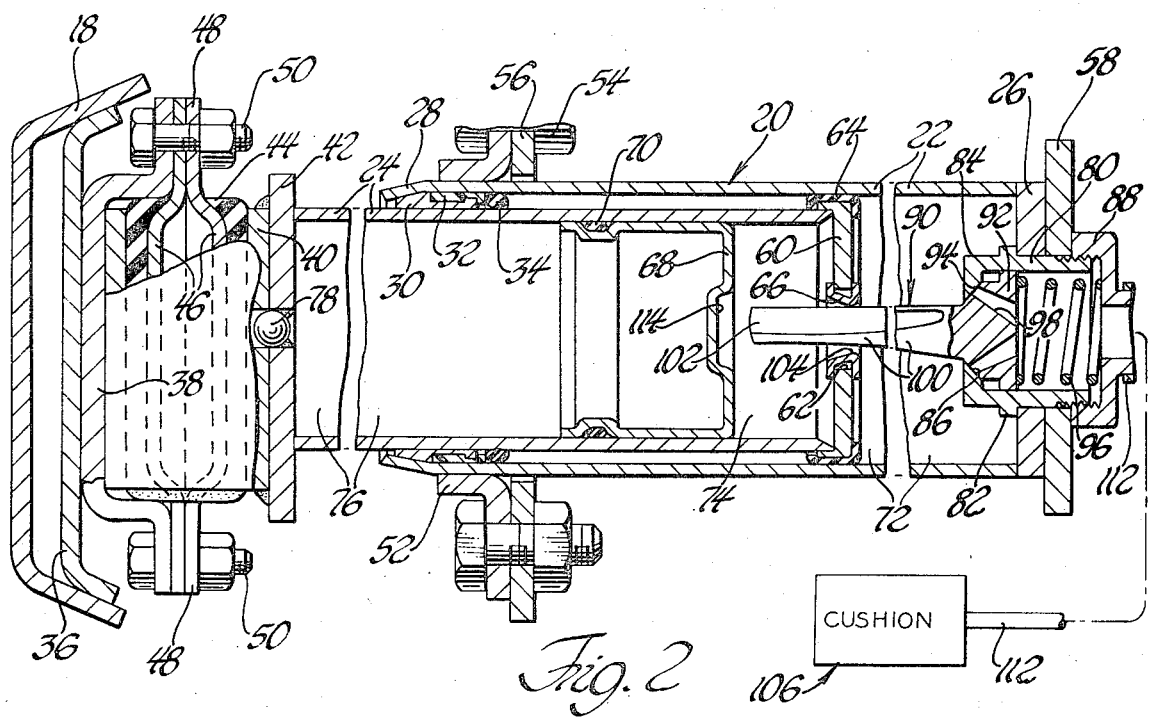

These and other objects of this invention will be readily apparent from the following specification and drawings wherein:

FIG. 1 is a partial perspective view of a vehicle embodying an occupant restrain system according to this invention; and FIG. 2 is an enlarged sectional view taken generally along the plane indicated by line 2—2 of FIG. 1.

Referring now particularly to FIG. 1 of the drawings, a vehicle body designated generally 10 and being of either the body-frame type or of the integral body type includes a frame or frame extension 12 having a pair of forward frame rails 14. Such rails are of conventional structure and are interconnected adjacent their free ends by a front frame cross member 16. A bumper or impact bar 18 extends across the front of the vehicle 10 and is supported thereon by a pair of like energy absorbing struts or devices 20. Such devices are of like structure and, accordingly, only one will be described in detail.

As shown in FIG. 2, the device 10 includes an outer cylindrical member 22 and an inner cylindrical member 24 which are telescopically arranged. The outer end of the member 22 is closed by a wall 26 which is welded to the member 22 and centrally apertured. The inner end of the member 22 is tapered inwardly at 28. A stabilizing ring 30 is secured to the outer surface of the member 24 and includes a tapered surface matching the tapered end 28 of the member 22 to thereby stabilize the members when assembled and in turn stabilize the impact bar 18. The ring 30 may be backed up by sealing rings 32 and 34 for the purpose to be hereinafter described.

An inner reinforcing plate 36 is provided on the impact bar 18 and a semi-cylindrical bracket 38 is welded to the plate 36. A cylindrical sleeve or bushing 40 is welded to a face plate or closure 42 of member 24 and includes an internal rubber sleeve 44. A tubular metal member 46 extends through and is bonded to the sleeve 44 and the flattened ends 48 of this member are bolted at 50 to the bracket 38.

In order to mount the impact bar 18 on the frame rail 14, the device 20 inludes an annular bracket 52 which is welded to member 24 and bolted at 54 to a leg of an angle bracket 56, the other leg of which is bolted to the frame rail. Additionally, wall 26 is welded or otherwise secured to a centrally apertured leg of a bracket 58, the other leg of which is bolted to the frame rail.

The inner end of member 24 is closed by a flanged piston or cap 60 having a central aperture 62. The outer periphery of the cap is enclosed within an annular sleeve 64 of suitable anti-friction material for free sliding movement of the member 24 and cap 60 relative to the member 22. A flanged orifice element 66 is received within the aperture 62 with the flanges of this element slidably embracing the cap 60 so that the orifice element may move radially but not axially with respect to the cap.

A flanged piston 68 is slidably received within the member 24 forwardly of the cap 60. The piston 68 is conventionally sealed to the inner wall of the member 24 by an O-ring 70. The cap 60 and the wall 26 define a first variable volume chamber 72 within member 22, and the cap 60 and piston 68 define a second variable volume chamber 74 within member 24. The communication between these chambers is, of course, through the orifice element 66. The chambers 72 and 74 are filled with a predetermined volume of pressurized liquefied gas, such as Freon at ambient temperature and under sufficient pressure to maintain the gas in liquid form. The liquefied gas flows past the seal 64 so as to fill the space between the outer wall of the member 24 and the inner wall of the member 22. The sealing rings 32 and 34 prevent leakage of the liquefied gas outwardly of the end of the member 22 past the stabilizing ring 30. The chamber 76 within the member 24 between the piston 68 and the plate 42 is filled with a suitable compressed gas, such as nitrogen, at approximately 150 psi. The chamber 76 is filled through an aperture in plate 42 which is later sealed in any conventional manner, such as by a ball 78 welded thereto. The compressed gas within the chamber 76 provides a gas spring urging or biasing the inner member 24 outwardly of member 22, or to the left, to thereby locate the impact bar 18 in its normal extended position, shown in FIGS. 1 and 2.

A hollow cylindrical valve body 80 fits within the apertures of the wall 26 and bracket 58, with the valve body being located by an annular flange 82 thereof engaging the wall 26. One end of the valve body is closed by an integral wall 84 having a central circular aperture defined by a tapered shoulder 86. The other end of the valve body is threaded and extends outwardly of the bracket 58. A threaded cap 88 receives this threaded end and seats against the bracket 58 to hold the flange 82 against the plate 26 and fixedly mount the valve body to the strut 20.

A metering pin assembly 90 includes a cylindrical piston portion or valve plug 92 which is slidably received within the valve body 80. The valve plug includes a cylindrical tapered shoulder 94 which seats against the tapered shoulder 86 under the action of a compression spring 96 which seats between the cap 88 and the inner end of the valve plug 92. A radial series of axially tapered ports or passages 98 in the valve plug open to the inner end of the valve plug and to the tapered shoulder 94.

A cylindrical metering pin or rod 100 of assembly 90 extends from the valve plug 92 and is positioned within the orifice element 66 as shown to cooperatively provide a variable area orifice therewith. The metering rod is generally of cylindrical cross-section but has three equally spaced flats 102 provided thereon. The cylindrical OD of the metering rod is slightly less than the OD of the cylindrical rib 104 of the orifice element 66. The slidable mounting of the orifice element on the cap 60 permits the orifice element to shift radially as required by relative movement of the metering rod within the orifice element when the members 22 and 24 move telescopically relative to each other. The flats 102 are of gradually decreasing depth relative to the secured end of the rod 100 so that the effective orifice area defined by the rod 100 and element 66 decreases as the rod moves through the element.

As is shown in FIG. 1, a conventional inflatable occupant restraint cushion, designated generally 106, is mounted on the vehicle within the passenger compartment thereof. The cushion 106 is shown inflated for purposes of clarity only. The cushion 106 is inflated from a diffuser 108 which communicates with a manifold 110. The manifold communicates with the caps 88 of both devices 20 through suitable passages 112. The cushion, diffuser and manifold are conventional and known to those skilled in the art.

When impact forces above a lower limit are applied to the impact bar 18, the member 24 and the cap 60 will move telescopically inwardly of the member 22 or to the right as viewed in FIG. 2. After initial compression of the gas in chamber 76, the liquefied gas in the chamber 72 is further pressurized and flows through the variable area orifice provided by element 66 and rod 100 to the chamber 74 to absorb the energy of the impact forces applied to the impact bar 18. It will be remembered that the area of the orifice decreases as the rod 100 moves within the orifice element 66. Accordingly, as the member 24 and cap 60 move within the member 22, there is an increasing fluid resistance to such movement and an increasing pressurization of chamber 72.

When the impact forces applied to the impact bar 18 are below a predetermined limit, the liquefied gas within the chamber 72 will be displaced through the variable orifice provided by the rod 100 and element 66 until such time as the impact forces cease. Upon cessation of the impat forces, the liquefied gas which has been displaced from the chamber 72 to the chamber 74 will flow back through the variable area orifice to the chamber 72 so that the device 20 will automatically reset itself for the next onset of impact forces.

With reference now to FIG. 2, it can be seen that there is a predetermined distance between the unsecured end of the metering rod 100 and the base wall 114 of a central circular depression in the piston 68. As the member 24 moves within the member 22, this distance will decrease and if the impact forces exceed a predetermined level, the metering rod will engage the wall 114. It should be noted here that once the initial compression of the gas in chamber 76 has occurred, the piston 68 moves as a unit with the member 24.

When the metering rod 100 engages the wall 114, the metering rod and the valve plug 92 will move as a unit to the right within the valve body 80 to unseat the shoulder 94 from the shoulder 86 and permit the pressurized liquefied gas in the chamber 72 to flow through the central opening in the wall 84 and through the passages 98 to the inner end of the valve plug. The gas will then flow through the cap 88 and the passage 112 to the manifold 110 and thence through the diffuser 108 to the cushion 106 to inflate the cushion. Thie liquefied gas will expand and be converted to a vapor as it flows to the cushion.

The spacing between the metering rod 100 and the wall 114 is set such that once a predetermined level of impact forces applied to the impact bar 18 is reached, the valve body 92 and the metering rod will open the passage 112 to the chamber 72 to provide for inflation of the cushion. The predetermined level or limit can be the limit of energy absorption of the device 20 or otherwise.

Although the foregoing description has been set forth in terms of only one of the devices 20, it will be recalled that both devices communicate through their respective passages 112 with the manifold 110 to inflate the cushion 106. The volume of vaporized gas required to inflate the cushion can be conventionally controlled through the use of suitable metering valves, such as check valves in the passages or otherwise.

Although the invention has been described in conjunction with a particular pressurized fluid medium, liquefied Freon, in the chambers 72 and 74, it should be noted that other liquefied gases can be used. Likewise, gases such as nitrogen under a pressure not exceeding the critical pressure can be used as the pressurized fluid medium. In the latter instance, the gas is in a gaseous form rather than being in a liquid form. Accordingly, it will be recognized that various pressurized fluid mediums can be employed in the chambers 72 and 74 in order to accomplish the purposes of this invention. The variable area orifice provided by the element 66 and the metering rod will have to be adjusted in accordance with the particular fluid medium employed.

From the foregoing description, it can be seen that the occupant restraint system of this invention employs a displaceable fluid medium in an energy absorbing device to accomplish energy absorption of impact forces applied to the impact bar of the vehicle and to also accomplish the inflation of an inflatable occupant restraint cushion should the impact forces exceed a predetermined level. In addition to cushions for front seat passengers, a cushion for the driver may likewise be inflated from the devices 20 and likewise cushions for other passengers. Additionally, of course, the invention can be employed for other types of inflatable occupant restraints.

Thus, the invention provides an improved occupant restraint system.

We claim:

1. In an automotive vehicle, the combination comprising, an inflatable occupant restraint mounted within an occupant compartment of the vehicle, a bumper impact bar, energy absorbing means supporting the impact bar on the vehicle and including a piston movable within a chamber containing a gas liquefied under pressure and ambient temperature, means controlling the displacement of the liquefied gas from one side of the piston to the other side of the piston upon impact of the impact bar with an obstacle to absorb the energy of the resultant impact forces, and means responsive to the displacement of a predetermined volume of liquefied gas to the other side of the piston for communicating the chamber and the restraint to release the liquefied gas for expansion and flow to the restraint for inflation thereof.

2. In an automotive vehicle, the combination comprising, an inflatable occupant restraint mounted within an occupant compartment of the vehicle, a bumper impact bar, energy absorbing means supporting the impact bar on the vehicle and including a piston movable within a chamber containing a gas liquefied under pressure and ambient temperature, means controlling the displacement of the liquefied gas from one side of the piston to the other side of the piston upon impact of the impact bar with an obstacle to absorb the energy of the resultant impact forces, means including normally closed valve means for communicating the chamber and the restraint, and means responsive to the displacement of a predetermned volume of liquefied gas to the other side of the piston for opening the valve means and communicating the chamber and the restraint to release the liquefied gas for expansion and flow to the restraint for inflation thereof.

3. In an automotive vehicle, the combination comprising, an inflatable occupant restraint mounted within an occupant compartment of the vehicle, a bumper impact bar, energy absorbing means supporting the impact bar on the vehicle and including an apertured piston movable within a chamber containing a gas liquefied under pressure and ambient temperature, means including resiliently seated valve means communicating the chamber and the restraint, control means on the valve means received within the piston aperture to control the displacement of the liquefied gas through the piston aperture from one side of the piston to the other side of the piston upon impact of the impact bar with an obstacle to absorb the energy of the resultant impact forces, and means operative upon the displacement of a predetermined volume of liquefied gas to the other side of the piston for engaging the control means to unseat the valve means and communicate the chamber and the restraint and release the liquefied gas for expansion and flow to the restraint for inflation thereof.

4. In an automotive vehicle, the combination comprising, an inflatable occupant restraint mounted within an occupant compartment of the vehicle, a bumper impact bar, energy absorbing means supporting the impact bar on the vehicle and including an apertured piston movable within a chamber containing a gas liquefied under pressure and ambient temperature, valve means on the chamber including a resiliently seated valve member and a metering member projecting therefrom through the piston aperture, the metering member controlling the displacement of the liquefied gas from one side of the piston to the other side of the piston upon impact of the impact bar with an obstacle to absorb the energy of the resultant impact forces, means operable upon the displacement of a predetermined volume of liquefied gas to the other side of the piston for engaging the metering member and unseating the valve means, and means communicating the valve means and the restraint to conduct the liquefied gas from the chamber for expansion and flow to the restraint for inflation thereof.

* * * * *